United States Patent [19]

Shank et al.

[11] Patent Number: 5,706,660
[45] Date of Patent: Jan. 13, 1998

[54] METHOD AND SYSTEM FOR AUTOMATICALLY CONTROLLING A SOLID PRODUCT DELIVERY MECHANISM

[75] Inventors: David Shank, Big Rapids; Robert E. Taylor, Cadillac, both of Mich.

[73] Assignee: Nartron Corporation, Reed City, Mich.

[21] Appl. No.: 772,026

[22] Filed: Dec. 19, 1996

[51] Int. Cl.$^6$ .................................................. F25C 5/18
[52] U.S. Cl. ........................... 62/66; 62/137; 222/56
[58] Field of Search ........................ 62/66, 137, 340; 222/1, 56, 196; 141/72

[56] References Cited

U.S. PATENT DOCUMENTS

| | | | |
|---|---|---|---|
| 3,935,970 | 2/1976 | Spaw | 222/56 |
| 4,630,755 | 12/1986 | Campbell | 222/196 |
| 4,635,444 | 1/1987 | Mawby et al. | 62/125 |
| 4,680,943 | 7/1987 | Mawby et al. | 62/300 |
| 4,822,996 | 4/1989 | Lind | 250/222.1 |
| 5,182,925 | 2/1993 | Alvarez et al. | 62/347 |
| 5,261,248 | 11/1993 | Willis et al. | 62/137 |
| 5,369,375 | 11/1994 | Cooper et al. | 329/347 |

Primary Examiner—William E. Tapolcal
Attorney, Agent, or Firm—Brooks & Kushman P.C.

[57] ABSTRACT

A method and system for automatically controlling a solid product delivery mechanism for replenishing the level of solid products in a storage bin which receives and stores the solid products. A mechanical vibration in the storage bin is generated and sensed. Based on the sensed mechanical vibration, an electrical signal is generated and processed to obtain a level signal. The level signal is representative of the fill level of the storage bin. Finally, a control signal is generated based on the level signal to control the delivery of the solid products.

33 Claims, 3 Drawing Sheets

METHOD AND SYSTEM FOR AUTOMATICALLY CONTROLLING A SOLID PRODUCT DELIVERY MECHANISM

TECHNICAL FIELD

This invention relates to a method and system for automatically controlling a solid product delivery mechanism such as an automatic ice making machine based on the fill level of a storage bin associated therewith.

BACKGROUND ART

In conjunction with solid product delivery mechanisms, it is often necessary to determine when additional product needs to be delivered or when enough product has been delivered. When a storage bin, such as a collection bin, is full it is desirable to prevent the delivery of additional products and, conversely, when the storage bin is empty, it is desirable to automatically deliver more products. However, determining the level of accumulation of solid products, such as ice cubes, is difficult due to the irregular arrangement of the solid products.

For instance, in automatic ice making machine applications, several known methods have been developed for determining the level of accumulation of ice cubes in a collection bin. One known method of determining the fill level of a collection bin makes use of a sensing arm as disclosed in U.S. Pat. No. 5,261,248, issued to Willis, et al., U.S. Pat. No. 4,635,444, issued to Mawby, et al., and U.S. Pat. No. 4,680,943, issued to Mawby, et al. However, contact sensors will produce inaccurate results if the objects being sensed do not come into contact with the sensor.

Alternatively, non-contact sensors, such as optical interruption or proximity sensors, ultrasonic proximity sensors, capacitive proximity sensors and magnetic proximity sensors can be used to determine the fill level of an ice cube collection bin. For example, U.S. Pat. No. 5,182,925, issued to Alvarez et al., discloses the use of an ultrasonic range finder to determine the fill level of ice in the collection bin. Furthermore, U.S. Pat. No. 4,822,996, issued to Lind discloses the use of a light interrupter system to determine the level of ice cubes in a collection bin. These types of sensors have varied responses due to contamination and changes in material. There is also a significant cost associated with the use of some of these sensors.

DISCLOSURE OF THE INVENTION

It is thus a general object of the present invention to provide a method and system for determining the fill level of a storage bin associated with a solid product delivery mechanism.

It is another object of the present invention to provide a method and system for automatically controlling the solid product delivery mechanism based on the fill level of the storage bin.

It is yet another object of the present invention to provide a method and system for automatically controlling the making of ice in an automatic ice-making machine based on the fill level of a collection bin associated with the ice-making machine.

In carrying out the above objects and other objects, features and advantages, of the present invention, a method is provided for determining the fill level of a storage bin. The method includes the step of generating a mechanical vibration above a predetermined threshold level in the storage bin. The method also includes the step of sensing the mechanical vibration and generating a corresponding electrical signal. Still further, the method includes the step of processing the electrical signal to obtain a level signal. Finally, the method includes the step of generating a control signal based on the level signal wherein the control signal is utilized to control the delivery of the solid products.

A system is also provided for carrying out the steps of the above described method. The system includes means for generating a mechanical vibration in the storage bin. The system also includes a sensor for sensing the mechanical vibration and generating a corresponding electrical signal. The system further includes means for processing the electrical signal to obtain a level signal. Finally, the system includes means for generating a control signal based on the level signal wherein the control signal is utilized to control the delivery of the solid products to the storage bin.

In further carrying out the above objects and other objects, features and advantages of the present invention, a method is provided for automatically controlling the making of ice in an automatic ice-making machine based on a fill level of a collection bin. The method includes the step of generating a mechanical vibration above a predetermined threshold level in the collection bin. The method also includes the step of sensing the mechanical vibration and generating a corresponding electrical signal. Still further, the method includes the step of processing the electrical signal to obtain a level signal. Finally, the method includes the step of generating a control signal based on the level signal wherein the control signal is utilized to control the replenishing of the ice.

A system is also provided for carrying out the steps of the above-described method. The system includes means for generating a mechanical vibration above a predetermined threshold level in the collection bin. The system also includes a sensor for sensing the mechanical vibration and generating a corresponding electrical signal. Still further, the system includes means for processing the electrical signal to obtain a level signal. Finally, the system includes means for generating a control signal based on the level signal wherein the control signal is utilized to control the replenishing of the ice.

The above objects, features and advantages of the present invention, as well as others, are readily apparent from the following detailed description of the best mode for carrying out the invention when taken in connection with the accompanying drawings.

BEST MODES FOR CARRYING OUT THE INVENTION

Figure 1:
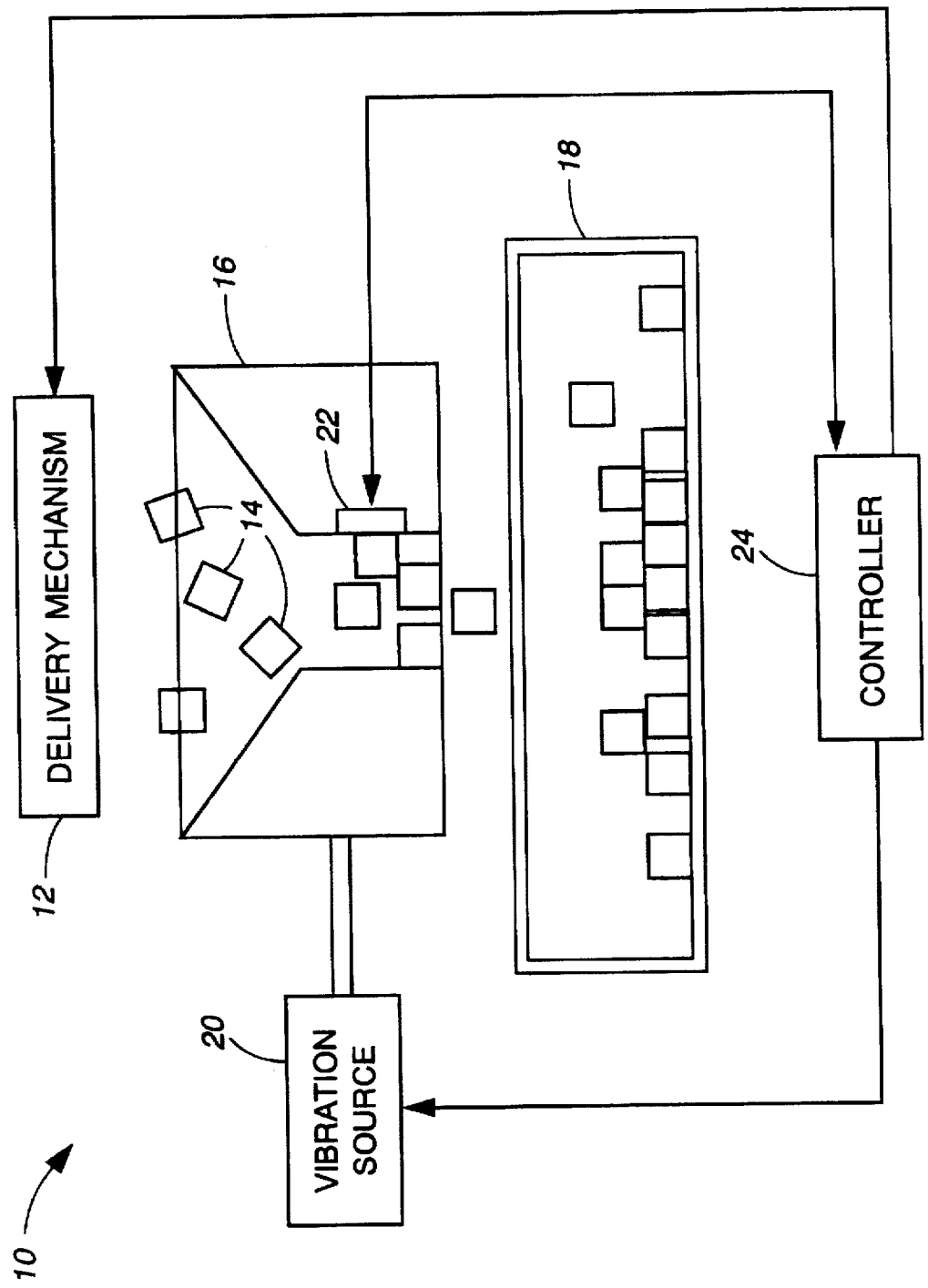
FIG. 1 is a block diagram of a preferred embodiment of the present invention.

Turning now to FIG. 1, there is shown a block diagram of the system of the present invention, denoted generally by reference numeral 10. The system 10 includes a delivery mechanism 12 for delivering a plurality of solid products 14, e.g., ice, rocks, ball bearings, etc. The system 10 also includes a storage bin 16 for receiving and storing the solid products 14.

The solid products 14 stored in the storage bin 16 may be received by a supplemental container 18. The supplemental container 18 may be a portion of a truck which is positioned under the storage bin 16 to receive the solid products 14, such as rocks, cement, etc. Alternatively, the supplemental container 18 may be a box or similar container that travels along a conveyor belt to receive the solid products 14 from the storage bin 16.

The system 10 of the present invention also includes means for generating a mechanical vibration in the storage bin 16. The means for generating the mechanical vibration includes a vibration source 20 coupled to the storage bin 16. The vibration source 20 generates mechanical vibrations above a predetermined threshold level, e.g., 20 KHz, so that the system 10 is insensitive to various surrounding noises. The vibration source 20 may be a motor that is turned on at predetermined intervals of time in order to vibrate the storage bin 16. Other vibration sources include an electromagnetic device, such as a solenoid, a magneto-strictive device, or a speaker. The mechanical vibrations of the storage bin 16 may also be generated by dropping the solid products 14 from the delivery mechanism 12 into the storage bin 16. Other vibration-producing sources not mentioned may be used as well to achieve similar vibration-inducing effects.

The system 10 of the present invention also includes a sensor 22 coupled to the collection bin 16 for sensing the mechanical vibrations and generating a corresponding electrical signal. The sensor 22 may be a microphone or a strain gauge pickup. Alternatively, the sensor 22 may be a piezo-electric element which acts as a vibration source to initiate the mechanical vibrations in the storage bin 16 and then acts as a sensor to monitor the decay and/or echoes of the mechanical vibrations.

A controller 24 is also provided for processsing the electrical signal generated by the sensor 22 to obtain a level signal. The electrical signal generated by the sensor 22 has a frequency and amplitude related to a frequency and amplitude of the mechanical vibration of the storage bin 16. When the storage bin 16 is relatively empty, the induced mechanical vibrations have a comparatively large amplitude. However, when the storage bin 16 begins to fill with the solid products 14, the solid products 14 will contact the walls of the storage bin 16 and absorb and dampen the mechanical vibrations. With the dampening action of the solid products 14, the amplitude of the mechanical vibrations can be expected to drop. This results in a lower amplitude electrical signal generated by the sensor 22.

The controller 24 may be a conventional peak detector for detecting the amplitude of the electrical signal. Additionally, signal processing means could be provided to analyze the spectral content, e.g., frequency and/or strength, of the vibrations to infer the degree to which the storage bin 16 has been filled. For example, an amplitude demodulator circuit as described in U.S. Pat. No. 5,369,375 to Cooper et al. may be used to process the electrical signal generated by the sensor 22.

An ideal location for the placement of the sensor 22 is selected through modeling and/or empirical measurement. It is desirable to select a location that minimizes unit to unit variation in the electrical signal generated by the sensor 22 between finished assemblies of the storage bin 16. This ideal location then simplifies or eliminates any calibration requirements once the sensor 22 is installed on the storage bin 16.

In the case in which the mechanical vibrations in the storage bin 16 are generated by dropping the solid products 14 into the storage bin 16, the time required for the solid products 14 to reach the storage bin 16 may be used as an indicator of the level in the storage bin 16 given that the time of release of the solid products 14 is known. The time of release may be pre-programmed so that it is known in advance, or, alternatively, the time of release may be detected. The time of release of the solid products may be detected by sensing mechanical vibrations above or below the predetermined threshold. Once the time of flight of the solid products 14 has been determined, it is used to determine the length of the path taken by the falling solid products 14 to reach the storage bin 16. In such a case, the shorter the length, the fuller the storage device 16 and vice versa.

The controller 24 of the system 10 also generates a control signal based on the level signal for controlling the delivery mechanism 12. If the level signal indicates that the storage bin 16 is depleted, the control signal is utilized to turn on the delivery mechanism 12 to begin releasing solid products 14 into the storage bin 16. On the other hand, if the level signal indicates that the storage bin 16 is full, then the solid products 14 are prevented from being delivered to the storage bin 16.

Figure 2:
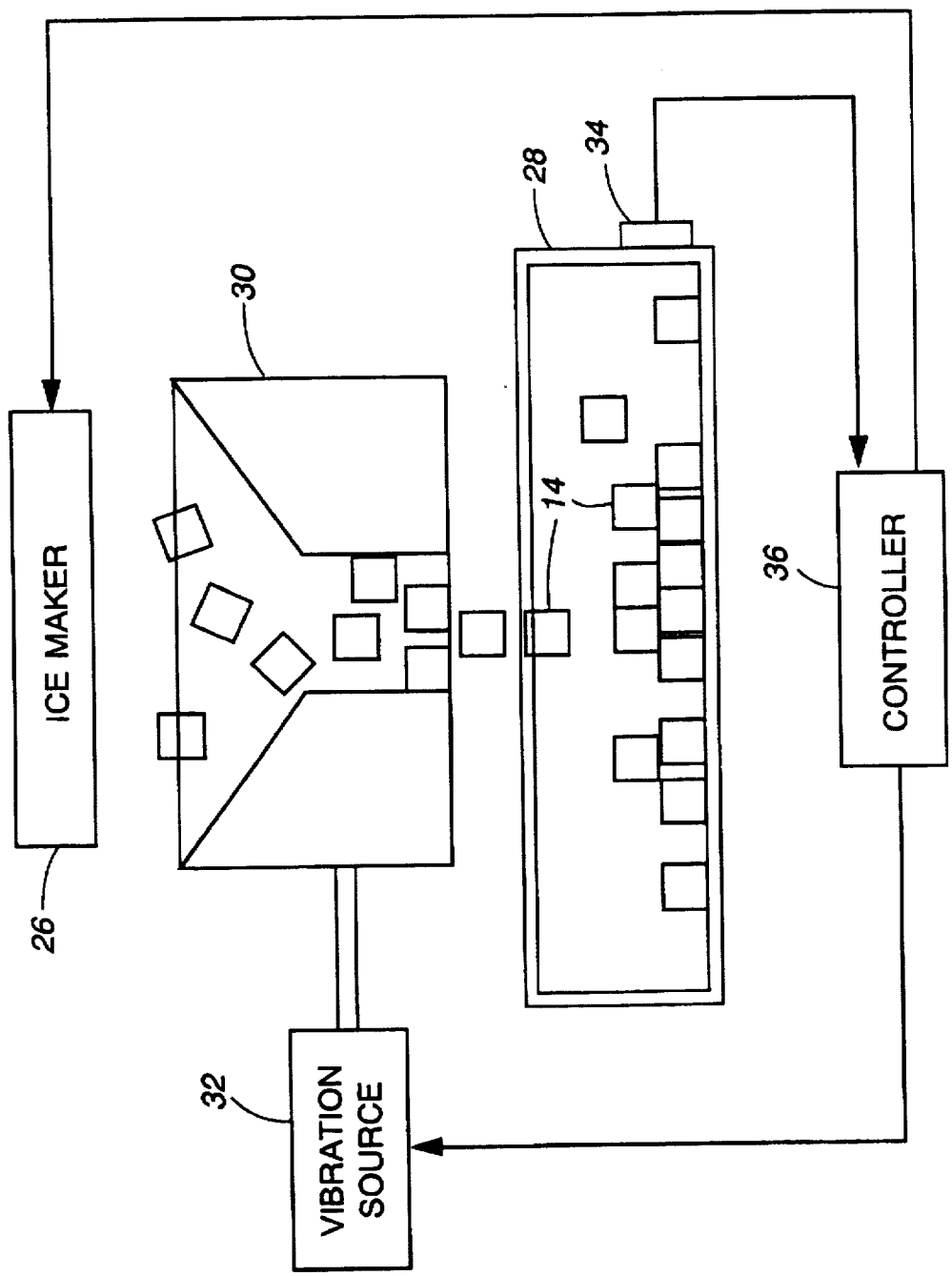
FIG. 2 is a block diagram of an alternative embodiment of the present invention.

Turning now to FIG. 2, there is shown a block diagram of the system of the present invention used in conjunction with an automatic ice-making machine. The automatic ice-making machine includes an ice maker 26 for making ice and a collection bin 28 for receiving and storing the ice. The ice may be guided from the ice maker 26 to the collection bin 28 via a chute 30. A vibration source 32 and a sensor 34 is coupled to the collection bin 28. Furthermore, a controller 36 is provided in communication with the vibration source 32, the sensor 34 and the ice maker 26. The mechanical vibrations are generated in the collection bin 28 and sensed and processed in the same manner as previously described.

The present invention also provides for monitoring the level of the collection bin 28 of the ice-making machine once it is determined that the collection bin 28 is full. If the ice 14 has not been removed from the collection bin 28 or has not melted, additional ice would overflow the collection bin 28. However, if the ice 14 is rapidly removed from the collection bin 28, there would be no way of detecting the status of the collection bin 28 until more ice is dropped. By detecting ice removal, a small amount of ice could subsequently be dropped to detect the level of the collection bin 28. The ice 14 may also be dropped at intervals of time corresponding to a known melting time for a quantity of ice comparable to that in a minimal drop. Once the ice falls, the level of the collection bin 28 could then be determined from the acoustic response. Ice removal is detected by sensing the mechanical vibrations below the predetermined threshold.

In the ice-making machine application, the control signal generated by the controller 36 may be utilized to initiate the making of ice if it is determined that the collection bin 28 is depleted. Alternatively, if the level signal indicates that the collection bin 28 is full, then the making of ice by the ice maker 26 is prohibited.

Figure 3:
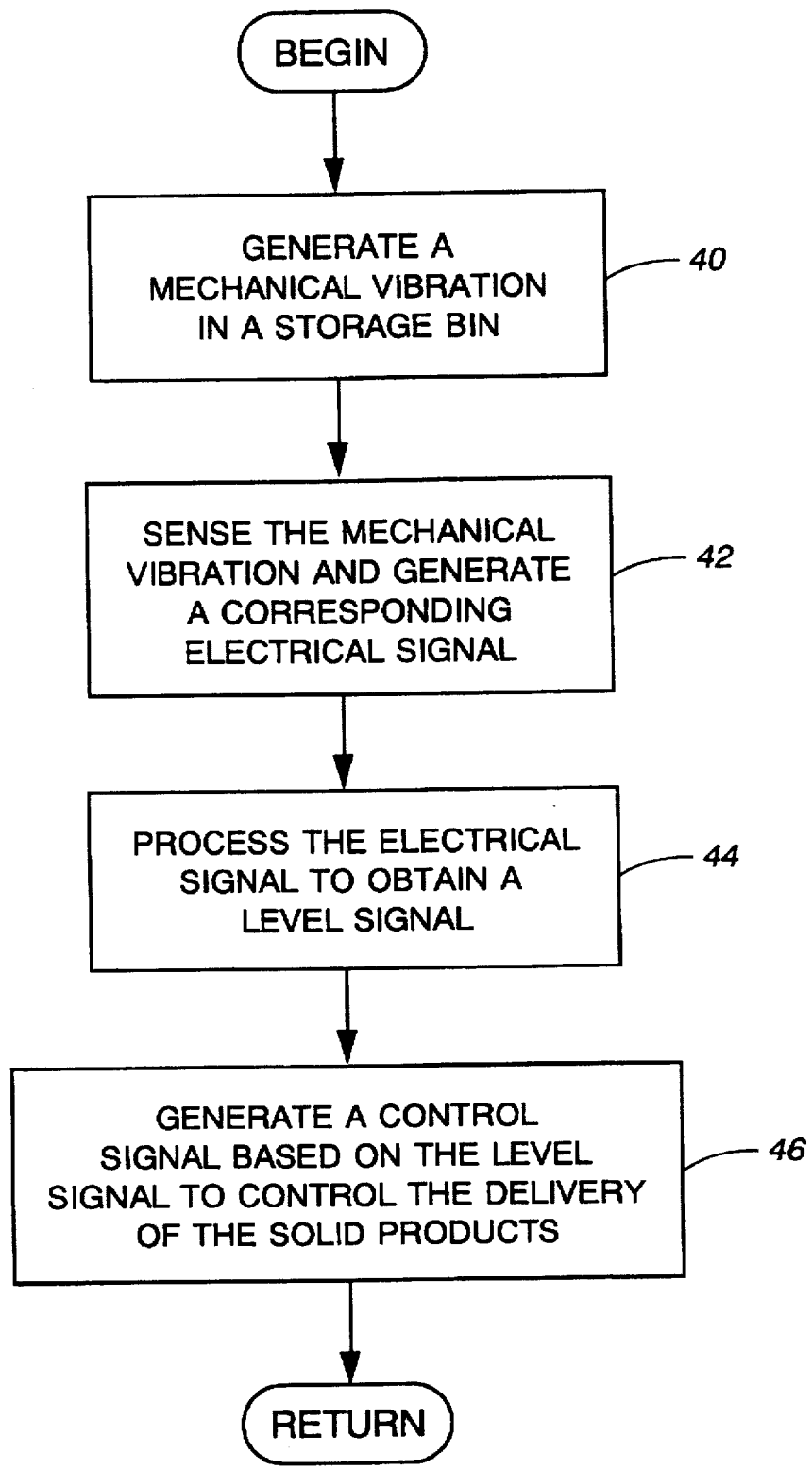
FIG. 3 is a flow diagram illustrating the general sequence of steps associated with the operation of the present invention.

Turning now to FIG. 3, there is shown a flow diagram illustrating the general sequence of steps associated with the operation of the present invention. The method includes the step of generating a mechanical vibration above a predetermined threshold level in a storage bin, as shown by block 40. The mechanical vibrations in the storage bin 16 may be generated by dropping solid products into the storage bin 16 or by exciting the storage bin 16.

The mechanical vibrations are then sensed and a corresponding electrical signal is generated, as shown by block 42. The electrical signal is processed to obtain a level signal, as shown by block 44.

Finally, the method concludes with the step of generating a control signal based on the level signal to control the delivery mechanism for delivering the solid products, as shown by block 46. For example, in an ice-making machine application, the control signal is utilized to either make ice or replenish ice, or to prevent additional ice from being made or added to the collection bin.

While the best modes for carrying out the invention have been described in detail, those familiar with the art to which this invention relates will recognize various alternative designs and embodiments for practicing the invention as defined by the following claims.

What is claimed is:

1. A method for automatically controlling a solid product delivery mechanism for replenishing the level of solid products in a storage bin which receives and stores the solid products, the method comprising:

generating a mechanical vibration above a predetermined threshold level in the storage bin;

sensing the mechanical vibration and generating a corresponding electrical signal;

processing the electrical signal to obtain a level signal; and generating a control signal based on the level signal wherein the control signal is utilized to control the delivery mechanism to either allow the delivery of the solid products or to prohibit the delivery of the solid products.

2. The method as recited in claim 1 wherein the step of processing the electrical signal comprises:

determining a first time corresponding to a time when the mechanical vibration is generated; and determining a second time corresponding to a time when the mechanical vibration is sensed.

3. The method as recited in claim 1 wherein the step of processing the electrical signal includes the step of determining an amplitude of the electrical signal.

4. The method as recited in claim 1 wherein the step of processing the electrical signal includes the step of determining a spectral content of the electrical signal.

5. The method as recited in claim 1 wherein the step of generating the mechanical vibration includes the step of dropping the solid products into the storage bin.

6. The method as recited in claim 1 wherein the step of generating the mechanical vibration includes the step of generating the mechanical vibration at predetermined intervals of time.

7. The method as recited in claim 1 wherein the step of generating the mechanical vibration includes the step of determining whether solid products have been removed from the storage bin.

8. The method as recited in claim 7 wherein the step of determining includes the step of sensing the mechanical vibration below the predetermined threshold level.

9. For use with an automatic ice-making machine having an ice maker for making ice and replenishing the level of ice in a collection bin which receives and stores the ice, a method for controlling the ice maker comprising:

generating a mechanical vibration above a predetermined threshold level in the collection bin;

sensing the mechanical vibration and generating a corresponding electrical signal;

processing the electrical signal to obtain a level signal; and generating a control signal based on the level signal wherein the control signal is utilized to control replenishing of the ice by the ice maker.

10. The method as recited in claim 9 wherein the step of generating the mechanical vibration includes the step of dropping the ice from the ice maker into the collection bin.

11. The method as recited in claim 9 wherein the step of generating the mechanical vibration includes the step of generating the mechanical vibration at predetermined intervals of time.

12. The method as recited in claim 9 wherein the automatic ice making machine includes a compressor associated therewith and coupled to the collection bin and wherein the step of generating the mechanical vibration includes the step of turning on the compressor.

13. The method as recited in claim 9 wherein the control signal is utilized to prevent the making of ice by the ice maker.

14. A system for automatically controlling a solid product delivery mechanism for replenishing the level of solid products in a storage bin which receives and stores the solid products, the system comprising:

means for generating a mechanical vibration above a predetermined threshold level in the storage bin;

a sensor for sensing the mechanical vibration and generating a corresponding electrical signal;

means for processing the electrical signal to obtain a level signal; and means for generating a control signal based on the level signal wherein the control signal is utilized control the delivery mechanism to either allow the delivery of the solid products or to prohibit the delivery of the solid products.

15. The system as recited in claim 14 wherein the means for processing the electrical signal comprises:

means for determining a first time corresponding to a time when the mechanical vibration is generated; and means for determining a second time corresponding to a time when the mechanical vibration is sensed.

16. The system as recited in claim 14 wherein the means for processing the electrical signal includes means for determining an amplitude of the electrical signal.

17. The system as recited in claim 14 wherein the means for processing the electrical signal includes means for determining a spectral content of the electrical signal.

18. The system as recited in claim 14 wherein the means for generating the mechanical vibration includes means for dropping the solid products into the storage bin.

19. The system as recited in claim 14 wherein the means for generating the mechanical vibration includes means for generating the mechanical vibration at predetermined intervals of time.

20. The system as recited in claim 14 wherein the means for generating the mechanical vibration is a piezoelectric transducer.

21. The system as recited in claim 20 wherein the sensor is a piezoelectric sensor.

22. The system as recited in claim 14 wherein the means for generating the mechanical vibration is an electromagnetic device.

23. The system as recited in claim 14 wherein the means for generating the mechanical vibration is a magnetostrictive device.

24. The system as recited in claim 14 wherein the means for generating the mechanical vibration is a speaker.

25. The system as recited in claim 14 wherein the means for generating the mechanical vibration includes means for determining whether the solid products have been removed from the storage bin.

26. The system as recited in claim 25 wherein the means for determining includes a sensor for sensing the mechanical vibration below the predetermined threshold level.

27. The system as recited in claim 14 wherein the sensor is a microphone.

28. The system as recited in claim 14 wherein the sensor is a strain gauge pickup.

29. For use with an automatic ice-making machine having an ice maker for making ice and replenishing the ice in a collection bin which receives and stores the ice from the ice maker, a system for controlling the ice maker comprising:

means for generating a mechanical vibration above a predetermined threshold level in the collection bin;

a sensor for sensing the mechanical vibration and generating a corresponding electrical signal;

means for processing the electrical signal to obtain a level signal; and means for generating a control signal based on the level signal wherein the control signal is utilized to control the replenishing of the ice by the ice maker.

30. The system as recited in claim 29 wherein the means for generating the mechanical vibration includes means for dropping the ice from the ice maker into the collection bin.

31. The system as recited in claim 29 wherein the means for generating the mechanical vibration includes means for generating the mechanical vibration at predetermined intervals of time.

32. The system as recited in claim 29 wherein the automatic ice making machine includes a compressor associated therewith and coupled to the collection bin and wherein the means for generating the mechanical vibration includes means for turning on the compressor.

33. The system as recited in claim 29 wherein the control signal is utilized to prevent the making of ice by the ice maker.

* * * * *